US009459950B2

(12) United States Patent
Bhamidipaty et al.

(10) Patent No.: US 9,459,950 B2
(45) Date of Patent: *Oct. 4, 2016

(54) LEVERAGING USER-TO-TOOL INTERACTIONS TO AUTOMATICALLY ANALYZE DEFECTS IN IT SERVICES DELIVERY

(71) Applicant: International Business Machines Corporation, Armonk, NY (US)

(72) Inventors: Anuradha Bhamidipaty, Bangalore (IN); Winnie Wing-Yee Cheng, West New York, NJ (US); Aliza R. Heching, Bronx, NY (US); Anshu N. Jain, Sunnyvale, CA (US); Jia Liu, White Plains, NY (US); James R. Moulic, Anchorage, AK (US); Daniela Rosu, Ossining, NY (US); Mithkal M. Smadi, Round Rock, TX (US); Srikanth G. Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/514,029

(22) Filed: Oct. 14, 2014

(65) Prior Publication Data

US 2015/0033077 A1    Jan. 29, 2015

Related U.S. Application Data

(63) Continuation of application No. 13/362,089, filed on Jan. 31, 2012, now Pat. No. 8,898,092.

(51) Int. Cl.
*G06F 15/18* (2006.01)
*G06F 11/07* (2006.01)
(Continued)

(52) U.S. Cl.
CPC ......... *G06F 11/079* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS

| 7,406,430 B2 | 7/2008 | Atefi et al. |
| 7,984,007 B2 | 7/2011 | Reumann et al. |

(Continued)

OTHER PUBLICATIONS

Lee et al.; Micro Interaction Metrics for Defect Prediction [online], Jun. 15, 2011. [retrieved on Jun. 23, 2014]. Retrieved from the Internet URL: http://www.cse.ust.hk/~hunkim/images/c/c2/Mim_fse2011.pdf; 11 pages.

(Continued)

*Primary Examiner* — Kakali Chaki
*Assistant Examiner* — Michael Zidanic
(74) *Attorney, Agent, or Firm* — Schmeiser, Olsen & Watts; Isaac J. Gooshaw

(57) ABSTRACT

An approach is presented for identifying related problem tickets in an information technology (IT) environment. A pattern of actions included in interactions with a computer program is determined to be effective at proactively preventing a problem in the IT environment based on a frequency at which user(s) performed the interactions which perform text and statistical analyses of content of historical problem tickets. A script based on the pattern of actions is generated. A root cause of the problem is determined based on the text and statistical analyses. Responsive to a receipt of a new problem ticket, the script is executed to automatically perform the pattern of actions. The new problem ticket is classified as being in a group of problem tickets which are related to the problem and included in the historical problem tickets. The new problem ticket is determined to specify the problem which has the root cause.

19 Claims, 7 Drawing Sheets

(51) Int. Cl.
*G06N 5/00* (2006.01)
*H04L 12/24* (2006.01)
*G06F 3/0484* (2013.01)

(52) U.S. Cl.
CPC ............ *G06F11/0751* (2013.01); *G06N 5/00* (2013.01); *H04L 41/069* (2013.01); *H04L 41/0631* (2013.01); *H04L 41/5074* (2013.01)

(56) References Cited

U.S. PATENT DOCUMENTS

| | | | |
|---|---|---|---|
| 8,266,072 | B2 | 9/2012 | Grace et al. |
| 8,898,092 | B2 | 11/2014 | Bhamidipaty et al. |
| 2005/0027816 | A1 | 2/2005 | Olney et al. |
| 2005/0033464 | A1 | 2/2005 | Nguyen |
| 2005/0081118 | A1 | 4/2005 | Cheston et al. |
| 2007/0118419 | A1 | 5/2007 | Maga et al. |
| 2009/0216697 | A1 | 8/2009 | Beaty et al. |
| 2009/0276728 | A1 | 11/2009 | Doan et al. |
| 2009/0292742 | A1* | 11/2009 | Morgan .............. G06F 11/0748 |
| 2010/0030768 | A1 | 2/2010 | Poblete et al. |
| 2010/0082620 | A1 | 4/2010 | Jennings, III et al. |
| 2010/0262615 | A1 | 10/2010 | Oztekin et al. |
| 2013/0198116 | A1 | 8/2013 | Bhamidipaty et al. |

OTHER PUBLICATIONS

Method and Apparatus to Manage Layout of User Interfaces Based on User Interaction Patterns, IP.com No. IPCOM000202350D, IP.com Electronic Publication: Dec. 14, 2010, 4 pages.
Office Action (Mail Date Jan. 16, 2014) for U.S. Appl. No. 13/362,089, filed Oct. 31, 2012, Confirmation No. 4759.
Amendment filed Apr. 16, 2014 in response to Office Action (Mail Date Jan. 16, 2014) for U.S. Appl. No. 13/362,089, filed Oct. 31, 2012; Confirmation No. 4759.
Notice of Allowance (Mail Date May 7, 2014) for U.S. Appl. No. 13/362,089, filed Oct. 31, 2012; Confirmation No. 4759.
Request for Continued Examination filed Jun. 23, 2014 for U.S. Appl. No. 13/362,089, filed Oct. 31, 2012; Confirmation No. 4759.
Notice of Allowance (Mail Date Jul. 11, 2014) for U.S. Appl. No. 13/362,089, filed Oct. 31, 2012; Confirmation No. 4759.

\* cited by examiner

LEVERAGING USER-TO-TOOL INTERACTIONS TO AUTOMATICALLY ANALYZE DEFECTS IN IT SERVICES DELIVERY

This application is a continuation application claiming priority to Ser. No. 13/362,089 filed Jan. 31, 2012, now U.S. Pat. No. 8,898,092, issued Nov. 25, 2014.

TECHNICAL FIELD

The present invention relates to a data processing method and system for knowledge management, and more particularly to a technique for identifying related problem tickets in an information technology environment.

BACKGROUND

Defect prevention in an information technology environment analyzes historical problem tickets to identify reoccurring problems, explore opportunities for prevention solutions, and track the impact of solution implementation. Identifying sets of tickets that relate to a common system or process problem is a first step towards assessing the root cause and devising actions to eliminate or avoid a reoccurrence of the problem. High accuracy and low costs of identifying related tickets are critical for efficient services delivery.

SUMMARY

In first embodiments, the present invention provides a method of identifying related problem tickets in an information technology (IT) environment. The method includes a computer storing user interactions with a computer program. The user interactions include inputs to the computer program to search for problem tickets issued in the IT environment that have the same characteristics. The method further includes the computer recognizing one or more user interaction patterns within the user interactions. The method further includes the computer selecting a user interaction pattern of the one or more user interaction patterns based on an evaluation of effectiveness of each of the one or more user interaction patterns. The method further includes the computer generating a rule, based on the user interaction pattern, for determining which problem tickets in the IT environment share a common characteristic. The method further includes the computer applying the rule to additional problem tickets issued in the IT environment to identify which of the additional problem tickets share the common characteristic.

In second embodiments, the present invention provides a computer system including a central processing unit (CPU), a memory coupled to the CPU, and a computer-readable, tangible storage device coupled to the CPU. The storage device contains instructions that, when carried out by the CPU via the memory, implement a method of identifying related problem tickets in an information technology (IT) environment. The method includes the computer system storing user interactions with a computer program, the user interactions comprising inputs to the computer program to search for problem tickets issued in the IT environment that have the same characteristics. The method further includes the computer system recognizing one or more user interaction patterns within the user interactions. The method further includes the computer system selecting a user interaction pattern of the one or more user interaction patterns based on an evaluation of effectiveness of each of the one or more user interaction patterns. The method further includes the computer system generating a rule, based on the user interaction pattern, for determining which problem tickets in the IT environment share a common characteristic. The method further includes the computer system applying the rule to additional problem tickets issued in the IT environment to identify which of the additional problem tickets share the common characteristic.

In third embodiments, the present invention provides a computer program product including a computer-readable, tangible storage device having computer-readable program instructions stored therein, the computer-readable program instructions, when carried out by a central processing unit (CPU) of a computer system, implement a method of identifying related problem tickets in an information technology (IT) environment. The method includes the computer system storing user interactions with a computer program, the user interactions comprising inputs to the computer program to search for problem tickets issued in the IT environment that have the same characteristics. The method further includes the computer system recognizing one or more user interaction patterns within the user interactions. The method further includes the computer system selecting a user interaction pattern of the one or more user interaction patterns based on an evaluation of effectiveness of each of the one or more user interaction patterns. The method further includes the computer system generating a rule, based on the user interaction pattern, for determining which problem tickets in the IT environment share a common characteristic. The method further includes the computer system applying the rule to additional problem tickets issued in the IT environment to identify which of the additional problem tickets share the common characteristic.

Embodiments of the present invention capture user interactions with existing analysis tools to guide a subsequent automated analysis of defects by a software-based tool, where explicit training of the tool is minimal and the accuracy of the automated analysis is similar to human-based results.

DETAILED DESCRIPTION

Overview

Embodiments of the present invention recognize that human expert analysis achieves high accuracy in the identification of related incident tickets (a.k.a. problem tickets) in an information technology (IT) environment at a very high data analysis cost. Embodiments of the present invention further recognize that known software-based tools can support human expert analysis, but the tools have diverse degrees of accuracy and overhead. For example, known classification/data mining algorithms have limited accuracy because of a domain specific sublanguage. Embodiments of the present invention further recognize that the aforementioned known tools require extensive human effort to train the tools. For example, for ticket classification into defect categories, a human analyst (e.g., Quality Analyst; a.k.a. QA) must build rule sets for rule-based classification, or manually label a large set of tickets for use with learning-based methods. Embodiments of the present invention further recognize that human action is necessary to determine sets of tickets that identify a problem based on defect category and/or specific ticket details. Embodiments of the present invention further recognize that although automation provided by tools can handle massive volumes of defects, automation on its own cannot adequately deal with the diverse and highly dynamic nature of incoming defects.

Embodiments of the present invention monitor and store user interaction patterns with data analysis tools that detect defects in an IT environment. Rules and/or methods are generated from the user interaction patterns. Effective user interaction patterns are identified. New data is analyzed using the generated rules and/or methods.

System for Identifying Related Problem Tickets

Figure 1A:
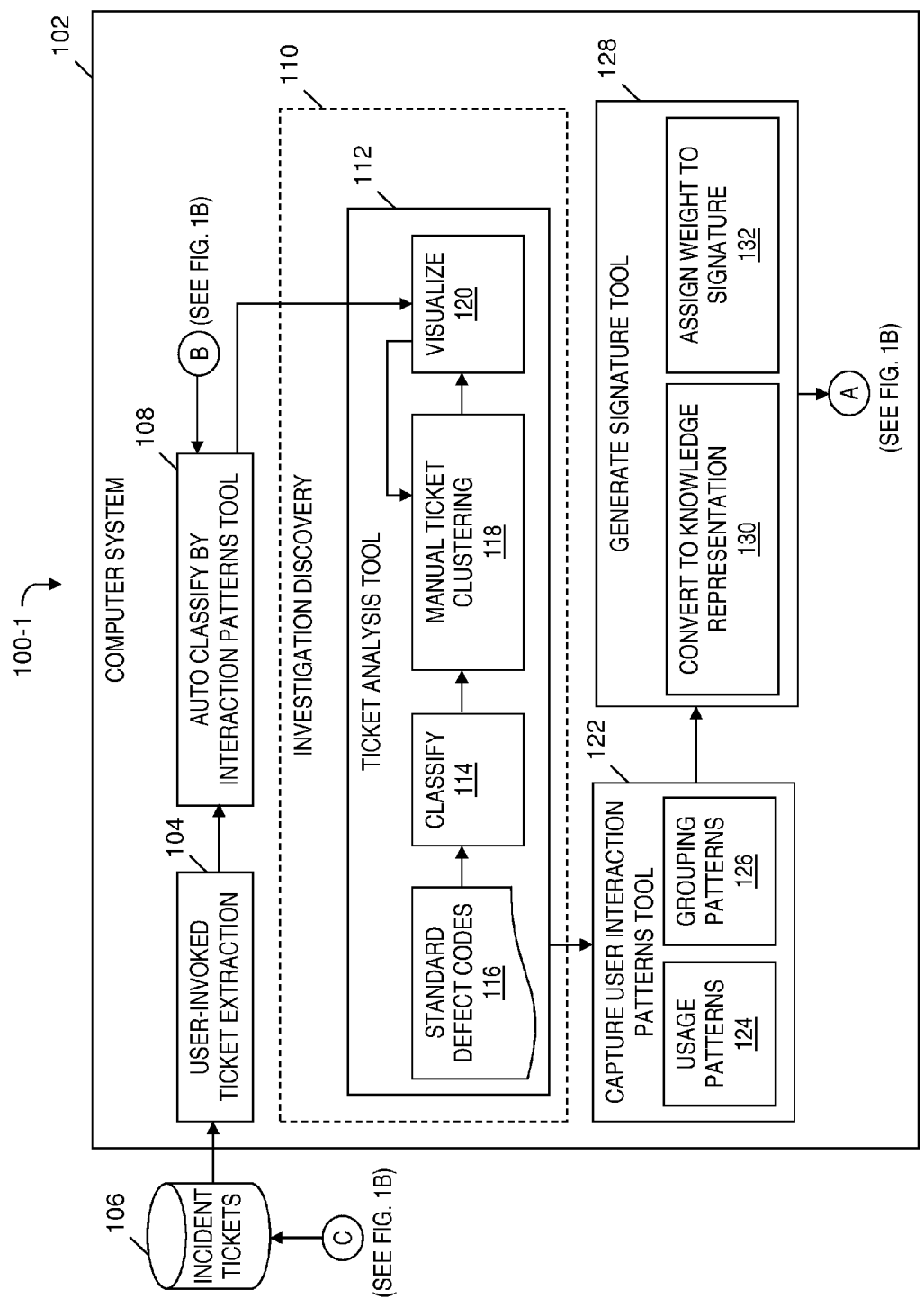
FIGS. 1A-1B depict a block diagram of a system for identifying related problem tickets in an information technology environment, in accordance with embodiments of the present invention.
Figure 1B:
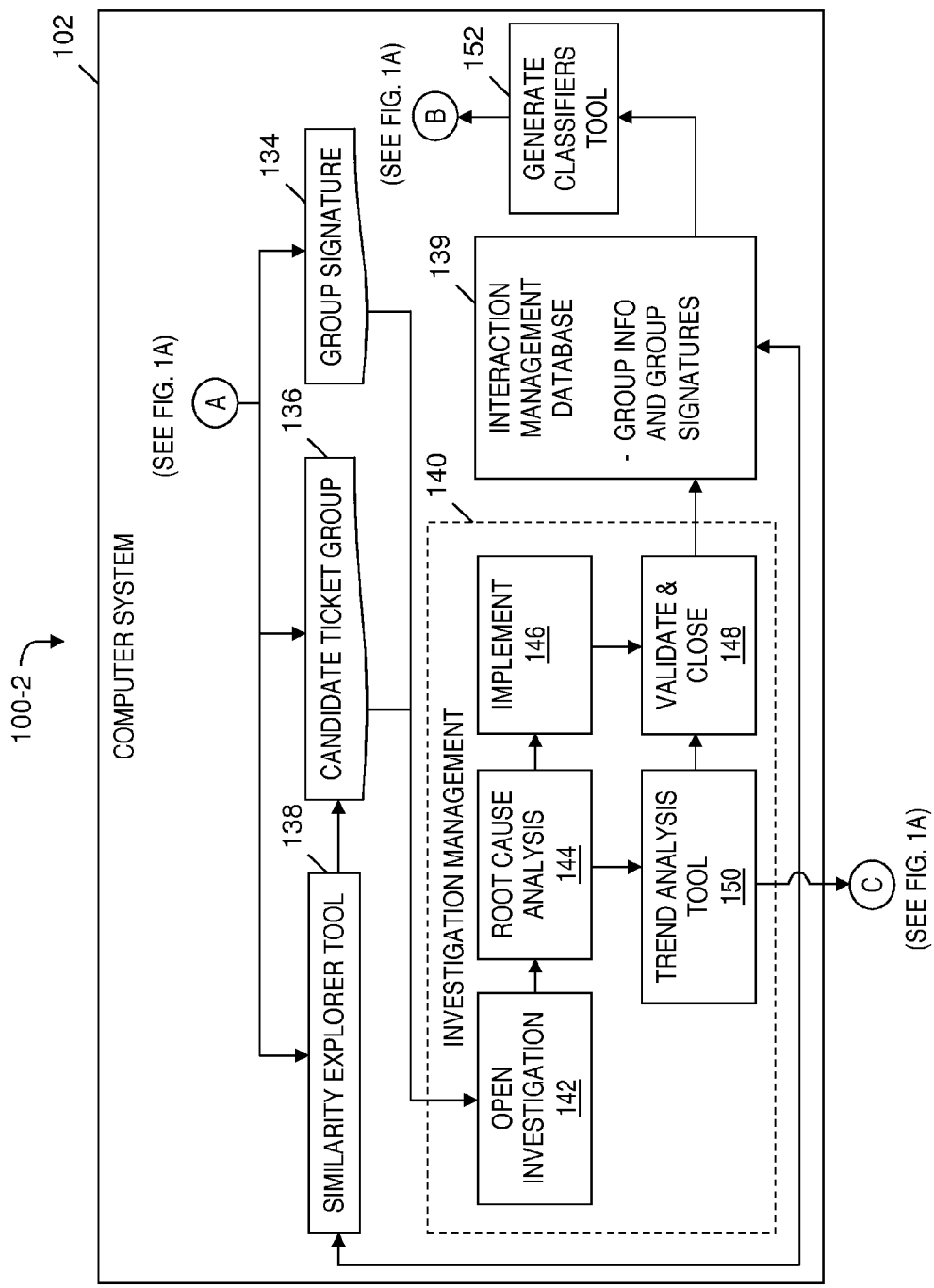

FIGS. 1A-1B depict a block diagram of a system for identifying related problem tickets in an information technology environment, in accordance with embodiments of the present invention. A system has a first portion 100-1 of the system depicted in FIG. 1A and a second portion 100-2 of the system depicted in FIG. 1B. Portion 100-1 of the system includes a computer system 102, which includes an extraction module 104 for providing a user-invoked extraction of incident tickets (a.k.a. problem tickets) from a data repository 106 that stores incident tickets. Computer system 102 runs a software-based auto classify by interaction patterns tool 108 that automatically classifies the extracted incident tickets according to patterns of user interactions that occur and are identified by an investigation discovery component 110, which includes ticket analysis tool 112 by which one or more users perform user interactions. The user(s) interact with ticket analysis tool 112, which runs a classify module 114 to classify incident tickets according to standard defect codes 116. Furthermore, the user(s) interact with ticket analysis tool 112 to perform manual ticket clustering 118 to look for similar root-cause groups of incident tickets. The result of clustering 118 is presented by a visualize module 120 provided by ticket analysis tool 112. Visualize module 120 may use Pareto charts and/or Process Behavior Analysis (PBA) to visualize the clustered incident tickets.

A capture user interaction patterns tool 122 monitors the patterns of user interactions with ticket analysis tool 112. For example, capture user interaction patterns tool 122 monitors a user's drill down pattern (i.e., a prioritization of attributes, which may include selecting the feature of "severity" of an incident ticket first). As another example, capture user interaction patterns tool 122 monitors the filter terms selected by a user, which may include a user selecting Severity 1 as a first filter and then selecting "APPLICATION" as a next filter. As still another example, capture user interaction patterns tool 122 monitors dictionary terms entered by a user, such as monitoring terms based on the regular expression {Process|Hang|Reboot} being used within the type "APPLICATION." Capture user interaction patterns tool 122 also captures details that describe the steps of a group of patterns of user interactions with ticket analysis tool 112, determines which steps are relevant or not relevant, and determines how results of one step become input for subsequent steps.

Capture user interaction pattern tool 122 stores each of the monitored user interaction patterns in a data repository for usage patterns 124 or in a data repository for grouping patterns 126. Usage patterns 124 may include attribute(s) or column(s) selected by a user and keyword(s) entered by the user. Grouping patterns 126 may include how columns of data are ordered by a user and what filters are selected by the user.

A software-based generate signature tool 128 receives the user interaction patterns monitored and stored by capture user interaction patterns tool 122. Generate signature tool 128 includes a conversion module 130 and a weight assignment module 132. Conversion module 130 converts each group of stored user interaction patterns to a knowledge representation by generating analysis procedures corresponding to respective groups of user interaction patterns (i.e., corresponding to respective group signatures). As used herein, a group signature is defined as a group of user interaction patterns. Each generated analysis procedure includes rule(s) and/or method(s) that describe the relevant steps of a corresponding group of user interaction patterns, and include a specification of how results of one step of a group of user interaction patterns becomes input for one or more subsequent steps. In one embodiment, conversion module 130 transforms each stored group of user interaction patterns into a script that can be run to repeat the steps included in the group of user interaction patterns.

Weight assignment module 132 evaluates each group of user interaction patterns (i.e., each group signature) and assigns a weight to each group signature based on the evaluation. Weight assignment module 132 evaluates the quality of groups of monitored user interaction patterns in order to select the most effective groups of user interaction patterns for use with automated or semi-automated analysis.

In one embodiment, weight assignment module 132 evaluates each group signature based on how many incident tickets are selected by the steps of the group of user interaction patterns associated with the group signature. Weight assignment module 132 may apply clustering algorithms on geographical and pool groups to determine the most prevalent user interaction patterns and may allow for the formation of ticket groups (i.e., inferred ticket categories or classes). For example, weight assignment module 132 may employ principal component analysis (PCA), where the feature set is defined as a subset of user interaction patterns, to determine the most prevalent user interaction patterns.

In one embodiment, generate signature tool 128 provides a semi-automated evaluation of a group signature by requesting user input to confirm the usefulness of components of the group signature. In another embodiment, generate signature tool 128 evaluates a group signature based on automated analyses that determine measures of significance of components of the group signature. For example, generate signature tool 128 may perform frequency analysis of a keyword used in a filter, where the frequency analysis indicates that the keyword is not a significant influence on the filter and may be ignored.

Generate signature tool 128 sends a group signature 134 and a candidate ticket group 136 to a similarity explorer tool 138, which are depicted in portion 100-2 in FIG. 1B. The similarity explorer tool 138 receives results (e.g., group signature 134 and candidate ticket group 136) from generate signature tool 128 (see FIG. 1A) and stores the received results in an interaction management database 139. For new incident tickets being received by the system depicted in FIGS. 1A-1B, similarity explorer tool 138 determines a similarity index to measure how similar group signature 134 is to an existing group signature stored in interaction management database 139. If similarity explorer tool 138 finds an existing group signature that is similar to group signature 134 based on the similarity index, then similarity explorer tool 138 retrieves the similar existing group signature from interaction management database 139.

An investigation management component 140 of portion 100-2 manages an investigation of root causes of defects in an IT environment to implement proactive prevention of future defects. Investigation management component 140 includes an open investigation module 142 that receives candidate ticket group 136 and group signature 134, and opens an investigation for proactive prevention of defects. Investigation management component 140 further includes a root cause analysis module 144 that determines a root cause of the incidents described in candidate ticket group 136. Investigation management component 140 further includes an implement module 146 that implements a preventive action to prevent future incidents having the same root cause. Investigation management component 140 further includes a validate and close module 148 that validates the effectiveness of the action implemented by implement module 146 and subsequently closes the investigation that had been opened by open investigation module 142. The validate and close module 148 stores the group signature 134 and associated information from the particular investigation being managed by investigation management component 140 (i.e., information about the root cause and preventive action taken to avoid the defect).

A trend analysis tool 150 included in investigation management component 140 receives the root cause determined by root cause analysis module 144 and monitors incident tickets 106 (see FIG. 1A) to determine whether the preventive action implemented by implement module 146 was successful in reducing defects having the aforementioned root cause.

After the validation provided by validate and close module 148, a generate classifiers tool 152 generates a classifier to define how to automatically classify a new incident ticket. The generated classifier is sent to auto classify by interactions pattern tool 108 (see FIG. 1A), which then uses the classifier to classify a new incoming incident ticket. Furthermore, visualize module 120 (see FIG. 1A) receives the classification results of tool 108 (see FIG. 1A) and presents a visualization of the behavior of the group in which the incoming incident ticket is classified.

The functionality of components of system portions 100-1 (see FIG. 1A) and 100-2 is further described below in the discussions relative to FIG. 2, FIG. 3, FIG. 4 and FIG. 5.

Process for Identifying Related Problem Tickets

Figure 2:
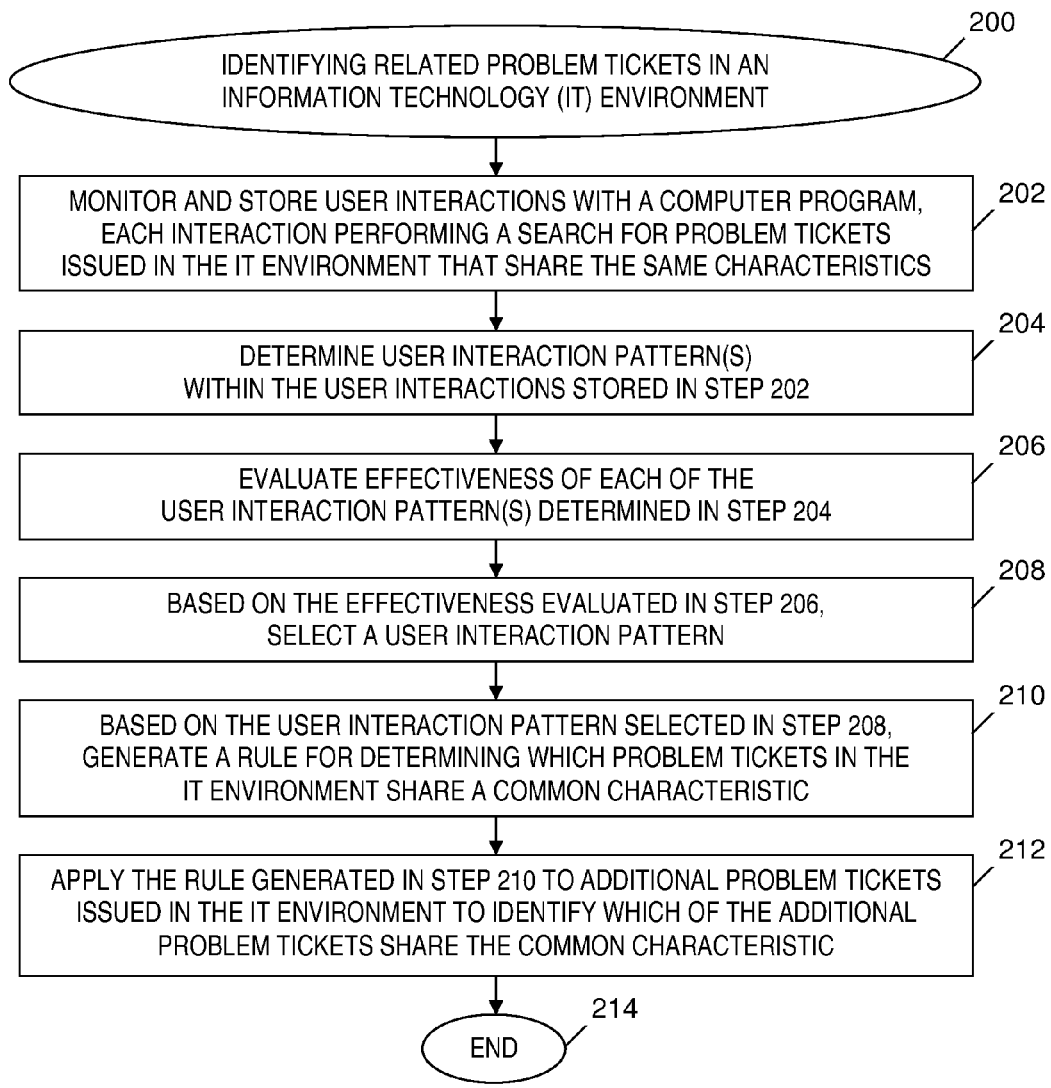
FIG. 2 is a flowchart of a process of identifying related problem tickets in an information technology environment, where the process is implemented in the system of FIGS. 1A-1B, in accordance with embodiments of the present invention.

FIG. 2 is a flowchart of a process of identifying related problem tickets in an information technology environment, where the process is implemented in the system of FIGS. 1A-1B, in accordance with embodiments of the present invention. The process of FIG. 2 starts at step 200. In step 202, capture user interaction patterns tool 122 (see FIG. 1A) monitors and stores user interactions with a computer program such as ticket analysis tool 112 (see FIG. 1A) (i.e., user-to-tool interactions), where the user interactions are included in a defect prevention process (DPP). The user interactions may be performed by a human analyst using a domain-specific software-based tool. The DPP may include identifying sets of tickets that are related to a system or process problem in the IT environment, which is a first step towards assessing a root cause of a problem in the IT environment. Each user interaction being monitored in step 202 performs targeted analysis of historical problem tickets that were issued in the IT environment and that share the same characteristics. The targeted analysis may use a domain specific tool to perform a search, text analysis and/or statistical analysis of the content in incident tickets 106 (see FIG. 1A). The user interactions analyze content in incident tickets 106 (see FIG. 1A), which includes multiple types of content including the main-driver content (e.g., incident tickets) and other domain-specific content that is relevant for the analysis (e.g., change tickets, server configuration records and system architecture details).

In one embodiment, monitoring user interactions in step 202 includes capturing details that describe steps of user interactions and any combination of:

determining a column or attribute (e.g., Severity of the ticket) that a user (e.g., QA) selected as a first type of data item by which to drill down in incident tickets 106 (see FIG. 1A) via ticket analysis tool 112 (see FIG. 1A);

determining one or more attributes that the user selected as filtering constraint(s) by which the data to be extracted from incident tickets 106 (see FIG. 1A) is narrowed, and if there are multiple filtering constraints, determining the order in which the user selected the filtering constraints;

determining keywords or dictionary terms entered by the user to generate a regular expression that narrows the data to be extracted from incident tickets 106 (see FIG. 1A); and determining the common attribute types that are co-selected by the user to narrow data to be extracted from incident tickets 106 (see FIG. 1A).

For example, a QA selects "Severity 1" as the first attribute and "Application" as the next filter by which incident tickets are to be extracted from the incident tickets 106 (see FIG. 1A), and then enters keywords that generate a regular expression {Process|Hang|Reboot} to further narrow down the incident tickets extracted from incident tickets 106 (see FIG. 1A).

In one embodiment, capture user interaction patterns tool 122 (see FIG. 1A) receives input from a human expert who generalizes a description of the user interaction steps being monitored in step 202. In subsequent steps of the process of FIG. 2, the generalized description of the user interaction steps may be used instead of the monitored user interaction steps in order to provide more extensive automation.

In step 204, capture user interaction patterns tool 122 (see FIG. 1A) determines one or more user interaction patterns (i.e., patterns of user interactions with a computer program such as ticket analysis tool 112 in FIG. 1A) within the user interactions monitored and stored in step 202 by generating automated analysis procedures for respective patterns of user interactions monitored in step 202. Capture user interaction patterns tool 122 (see FIG. 1A) generates the aforementioned analysis procedures by integrating the descriptions of the user interaction steps captured in step 202. An analysis procedure generated in step 204 may be the result of capture user interaction patterns tool 122 (see FIG. 1A) automatically integrating the steps of multiple analysis tasks into the analysis procedure.

In one embodiment, capture user interaction patterns tool 122 (see FIG. 1A) generates the automated analysis procedures for execution environments that are external to the computer program (e.g., ticket analysis tool 112 in FIG. 1A) utilized by the user to perform the user interactions monitored in step 202. For example, capture user interaction patterns tool 122 (see FIG. 1A) generates an analysis procedure for an execution environment that comprises a batch procedure scheduled to execute periodically on a computer system connected to one or more databases and/or analytic tool libraries. As another example, the aforementioned execution environment may be a data warehouse collecting incident ticket updates and the analysis tasks implemented by automatically classifying incidents by failure codes and determining groups of tickets having the same root cause.

In step 206, generate signature tool 128 (see FIG. 1A) evaluates the effectiveness of each user interaction pattern determined in step 204. In one embodiment, the generate signature tool 128 (see FIG. 1A) performs a frequency analysis by determining how many users perform user interactions in each user interaction pattern determined in step 204 per unit of time. Based on the frequency analysis, generate signature tool 128 (see FIG. 1A) weights the user interaction patterns. Based on the weighted user interaction patterns, generate signature tool 128 (see FIG. 1A) determines whether a particular user interaction pattern is effective (i.e., relevant) or not (e.g., a weight that exceeds a predefined value indicates an effective user interaction pattern).

In another embodiment, generate signature tool 128 (see FIG. 1A) evaluates the effectiveness of each user interaction pattern determined in step 204 by an automated method such as applying a clustering algorithm on a geographical location and a pool group. The clustering algorithm may use, for instance, principal component analysis (PCA), where the feature set is defined as a subset of the user interaction patterns.

Step 206 also includes generate signature tool 128 (see FIG. 1A) determining for each user interaction step of a user interaction pattern whether a result of the user interaction step is input for subsequent user interaction step(s).

Further, step 206 includes generate signature tool 128 (see FIG. 1A) generating group signature 134 (see FIG. 1B) by converting the effective user interaction pattern(s) to a rule or method (i.e., an executable script). Group signature 134 (see FIG. 1B) may include values of attributes that specify a group of user interaction patterns determined to be effective in step 206.

In step 208, based on the effectiveness evaluated in step 206, generate signature tool 128 (see FIG. 1A) selects a user interaction pattern that is effective.

In step 210, based on the user interaction pattern selected in step 208, generate classifiers tool 152 (see FIG. 1B) generates a rule for determining which problem tickets in the IT environment share a common characteristic.

In step 212, auto classify interaction patterns tool 108 (see FIG. 1A) applies the rule generated in step 210 to additional problem tickets issued in the IT environment to identify which of the additional problem tickets share the aforementioned common characteristic. In one embodiment, auto classify interaction patterns tool 108 (see FIG. 1A) executes the analysis procedure generated in step 204 that corresponds to a user interaction pattern by translating the representation of the user interaction pattern and input parameter descriptions into tool actions (i.e., actions performed by the ticket analysis tool 112 in FIG. 1A) or procedures depending on the execution environment. The analysis procedure may be executed in step 212 based on a scheduled event (e.g., a daily database update) or on demand by a user.

Step 212 does not cluster the additional incident tickets based on a relevance matrix between query patterns and tickets. Instead, the classification (or topic) of the user interaction patterns is predetermined by the candidate tickets initially clustered in step 204 and are refined iteratively using a classifier newly generated by generate classifiers tool 152 (see FIG. 1B).

Figure 4:
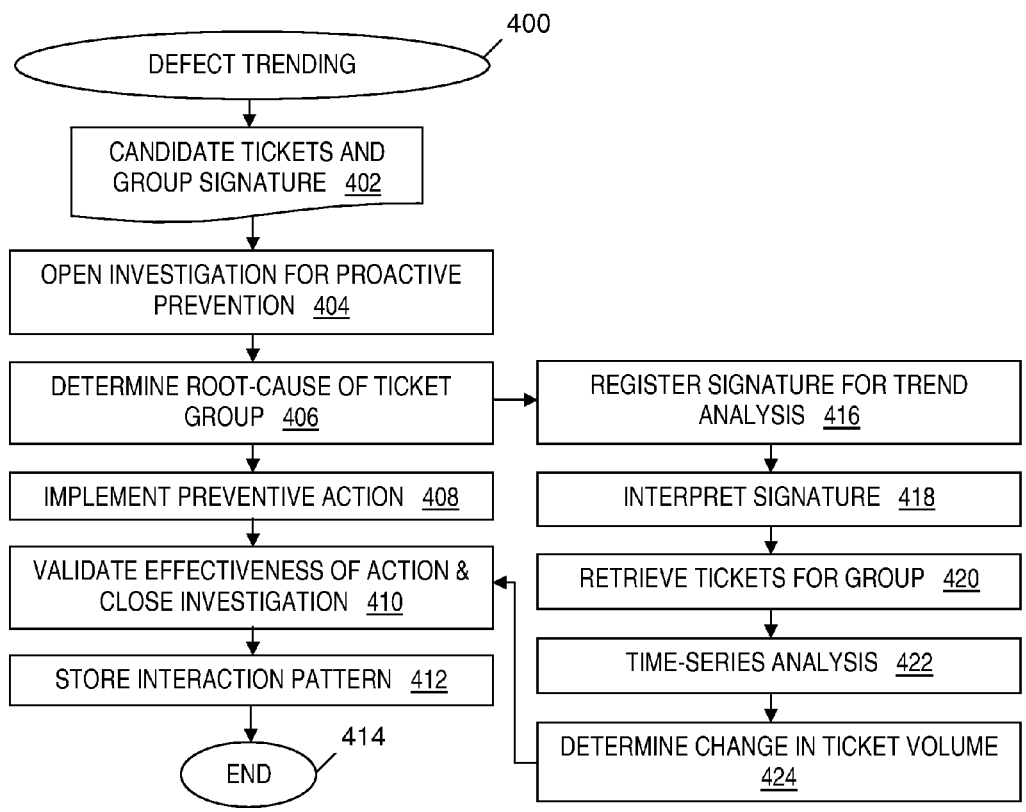
FIG. 4 is a flowchart of a process of defect trending, where the process is implemented in the system of FIGS. 1A-1B, in accordance with embodiments of the present invention.
Figure 5:
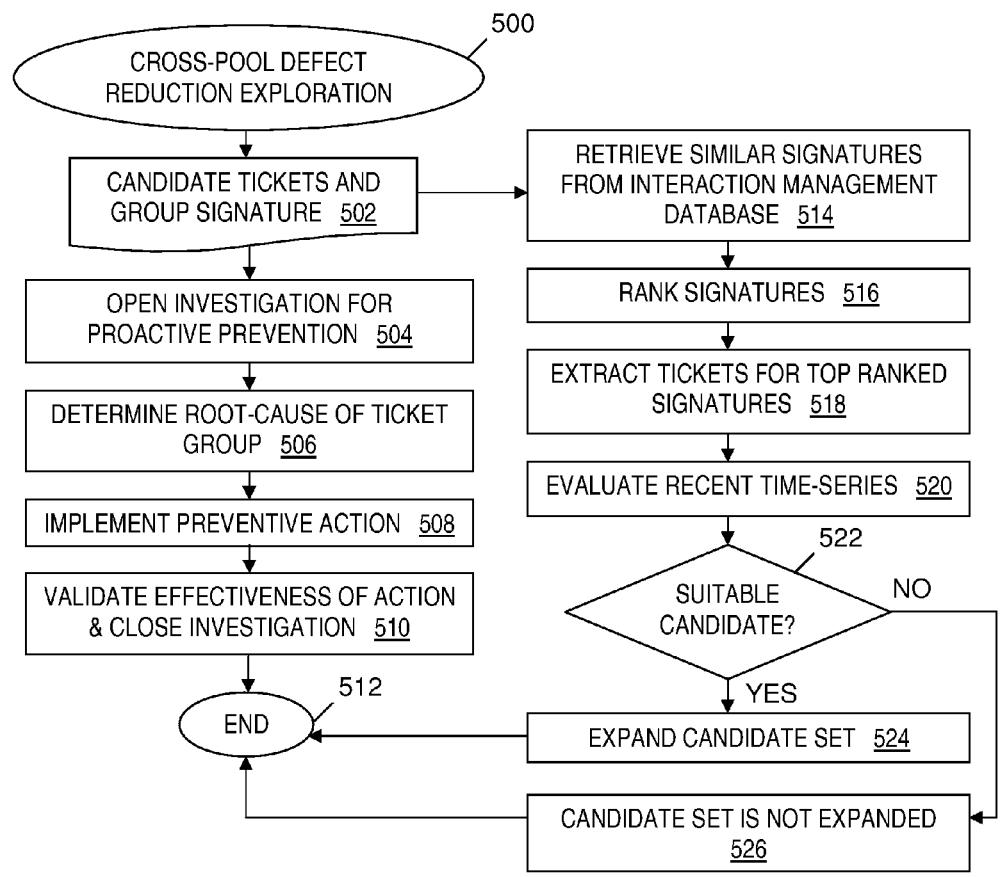
FIG. 5 is a flowchart of a process of cross-pool defect reduction exploration, where the process is implemented in the system of FIGS. 1A-1B, in accordance with embodiments of the present invention.

Applying the rule in step 212 may be included in a first use case scenario in which new incident tickets assigned to a pool are automatically classified (see FIG. 3); a second use case scenario in which defect reoccurrence and trends are tracked (see FIG. 4); and/or a third use case scenario in which the scope of defect prevention is expanded across pools, accounts, delivery enters (see FIG. 5).

The process of FIG. 2 ends at step 214.

Classifying a Problem Ticket

Figure 3:
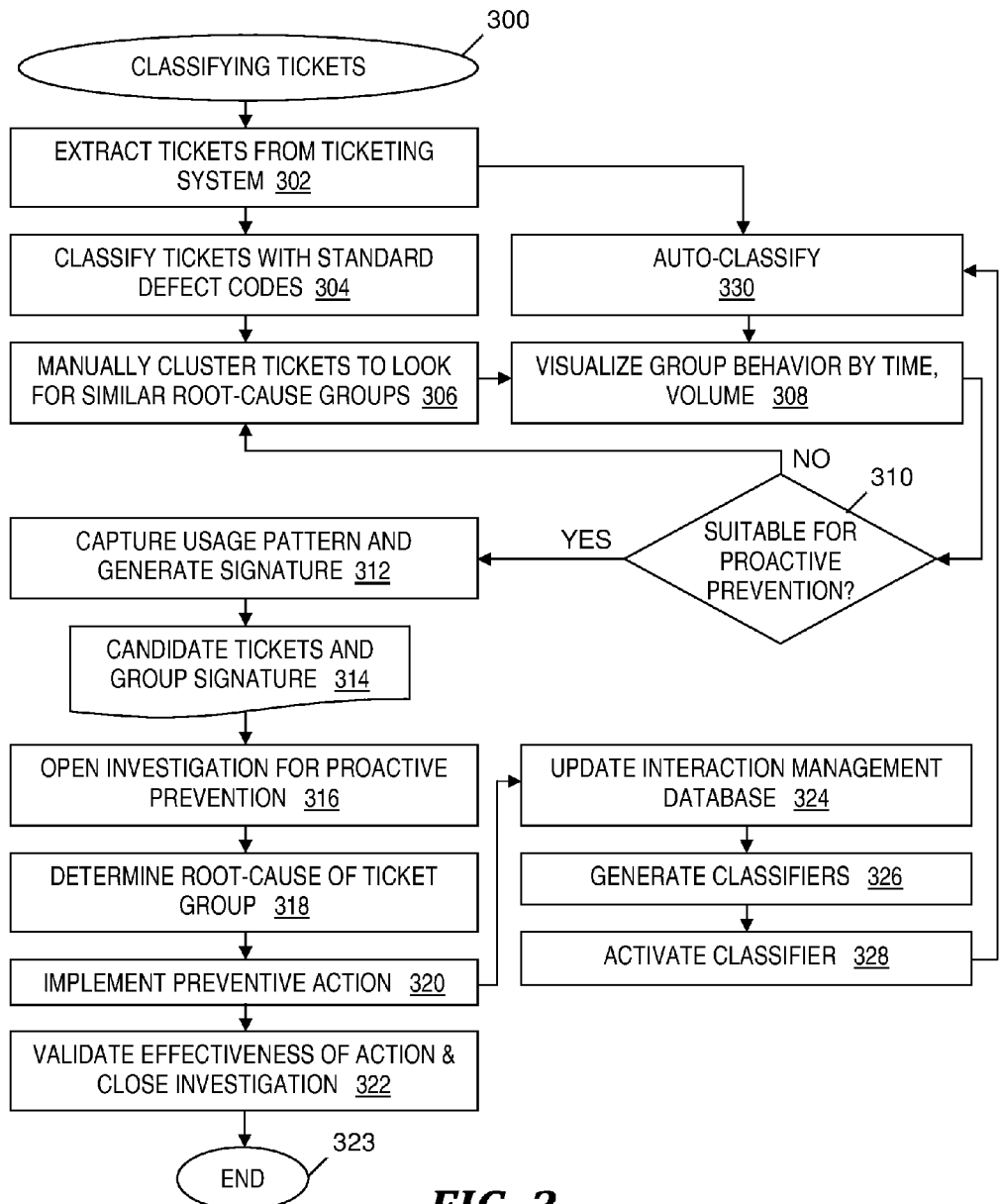
FIG. 3 is a flowchart of a process of classifying problem tickets, where the process is implemented in the system of FIGS. 1A-1B, in accordance with embodiments of the present invention.

FIG. 3 is flowchart of a process of classifying problem tickets, where the process is implemented in the system of FIGS. 1A-1B, in accordance with embodiments of the present invention. The process of FIG. 3 begins at step 300. In step 302, ticket extraction module 104 (see FIG. 1A) extracts tickets from incident tickets 106 (see FIG. 1A).

In step 304, ticket analysis tool 112 (see FIG. 1A) runs classify module 114 (see FIG. 1A) to classify the tickets extracted in step 302 according to standard defect codes 116 (see FIG. 1A).

In step 306, a user interacting with ticket analysis tool 112 (see FIG. 1A) performs manual ticket clustering 118 (see FIG. 1A) to cluster the tickets extracted in step 302 to identify one or more groups of tickets, where tickets in each identified group have a similar root cause.

In step 308, visualize module 120 (see FIG. 1A) generates a visualization of the behavior of each group identified in step 306 by time and volume and presents the visualization to a user. Visualize module 120 (see FIG. 1A) may use Pareto charts and/or PBA to visualize the behavior of a group identified in step 306.

In step 310, based on the visualization provided in step 308, ticket analysis tool 112 (see FIG. 1A) determines or receives an indication of whether or not each group of tickets identified in step 306 is suitable for proactive prevention of the defects associated with the respective groups of tickets. If the identified group of tickets is determined in step 310 to be suitable for proactive prevention, then ticket analysis tool 112 (see FIG. 1A) designates the identified group of tickets as the candidate ticket group 136 (see FIG. 1B), the Yes branch of step 310 is taken and step 312 is performed; otherwise, the process of FIG. 3 loops back to step 306 to cluster tickets to identify another group of tickets that have a similar root cause.

In step 312, capture user interaction patterns tool 122 (see FIG. 1A) captures a usage pattern that specifies a pattern of user interactions with ticket analysis tool 112 (see FIG. 1A) that resulted in determining the identified group of tickets. For example, capture user interaction patterns tool 122 (see FIG. 1A) captures usage patterns 124 (see FIG. 1A) (e.g., columns selected and keywords entered) and grouping patterns 126 (see FIG. 1A) (e.g., ordering of columns and filters).

Step 312 also includes generate signature tool 128 (see FIG. 1A) generating a group signature 134 (see FIG. 1B) associated with the specified pattern of user interactions. The result of steps 310 and 312 is candidate tickets and group signature 314, which includes the tickets in candidate ticket group 136 (see FIG. 1B) and the group signature generated in step 312.

Generate signature tool 128 (see FIG. 1A) sends the candidate tickets and group signature 314 to open investigation module 142 (see FIG. 1B). In step 316, open investigation module 142 (see FIG. 1B) opens an investigation for the aforementioned proactive prevention.

In step 318, root cause analysis module 144 (see FIG. 1B) determines a root cause of the defect indicated by the incident tickets in candidate tickets and group signature 314.

In step 320, implement module 146 (see FIG. 1B) implements a preventive action for preventing the defect indicated by the tickets in candidate tickets and group signature 314.

In step 322, which follows step 320, validate and close module 148 (see FIG. 1B) validates the effectiveness of the preventive action implemented in step 320 and closes the investigation that was opened in step 316. The phase of the ticket classification process managed by investigation management component 140 (see FIG. 1B) ends at step 323.

In step 324, which also follows step 320, interaction management database 139 (see FIG. 1B) receives and stores the group signature included in candidate tickets and group signature 314 and information about the group signature, including a specification of the root cause determined in step 318 and the preventive action implemented in step 320, as well as an identification of the investigation performed by the investigation management 140 (see FIG. 1B) to determine the root cause determined in step 318.

In step 326, generate classifiers tool 152 (see FIG. 1B) generates classifiers, where each classifier is a set of rules, a set of procedures or an executable script that determines which problem tickets in the IT environment share the same group signature associated with the tickets in candidate tickets and group signature 314. For example, the classifier generated in step 326 is Cluster Group 1: Country A->SysOp->Pool Intel->*, Short Description=file, Severity=1, Long Desc=disk|file|log.

In step 328, generate classifiers tool 152 (see FIG. 1B) activates the classifier generated in step 326 and sends the classifier to auto classify by interaction patterns tool 108 (see FIG. 1A).

In step 330, auto classify by interaction patterns tool 108 (see FIG. 1A) receives additional (i.e., new) incident tickets and automatically classifies the additional incident tickets by applying the classifier generated in step 326. For example, step 330 includes the auto classify by interaction patterns tool 108 (see FIG. 1A) executing the script which is the classifier generated in step 326, and in response to executing the script, classifying the new incident tickets as being in a ticket group sharing the same group signature included in candidate tickets and group signature 314, and generating and presenting to a user a visualization in step 308 of the behavior of the ticket group in which the new incident tickets are classified.

Defect Trending

FIG. 4 is a flowchart of a process of defect trending, where the process is implemented in the system of FIGS. 1A-1B, in accordance with embodiments of the present invention. The process of FIG. 4 starts at step 400. Generate signature tool 128 (see FIG. 1A) sends candidate tickets and group signature 402 to open investigation module 142 (see FIG. 1B). Candidate tickets and group signature 402 includes incident tickets in candidate ticket group 136 (see FIG. 1B) and group signature 134 (see FIG. 1B). In one embodiment, candidate tickets and group signature 402 is the same as candidate tickets and group signature 314 (see FIG. 3).

In step 404, open investigation module 142 (see FIG. 1B) receives candidate tickets and group signature 402 and opens an investigation of the candidate tickets for proactive prevention of the defect associated with the incident tickets in candidate tickets and group signature 402. For example, the investigation may be opened for incident tickets that are related to storage systems (i.e., the group signature is associated with storage systems).

In step 406, root cause analysis module 144 (see FIG. 1B) determines a root cause of the defect indicated by the incident tickets in candidate tickets and group signature 402.

In step 408, implement module 146 (see FIG. 1B) implements a preventive action for preventing the defect indicated by the incident tickets in candidate tickets and group signature 402.

In step 410, validate and close module 148 (see FIG. 1B) validates the effectiveness of the preventive action implemented in step 408 and closes the investigation that was opened in step 404.

In step 412, validate and close module 148 (see FIG. 1B) sends to interaction management database 139 (see FIG. 1B) the user interaction pattern associated with the group signature included in candidate tickets and group signature 402. The phase of the defect trending process managed by investigation management component 140 (see FIG. 1B) ends at step 414.

In step 416, which follows step 406, trend analysis tool 150 (see FIG. 1B) receives the group signature included in candidate tickets and group signature 402 from root cause analysis module 144 (see FIG. 1B) and registers the aforementioned group signature for trend analysis (i.e., determining how the volume of incoming incident tickets in a group indicated by the group signature behaves over a specified period of time). In step 418, trend analysis tool 150 (see FIG. 1B) interprets the group signature included in candidate tickets and group signature 402. In one embodiment, trend analysis tool 150 (see FIG. 1B) may also search for and identify patterns (including time lagged) across different group signatures. Based on an identification of the aforementioned patterns across different group signatures, trend analysis tool 150 (see FIG. 1B) may determine a reduction in the volume of incoming incident tickets.

In step 420, trend analysis tool 150 (see FIG. 1B) retrieves incident tickets based on the group signature included in candidate tickets and group signature 402. In step 422, trend analysis tool 150 (see FIG. 1B) performs a time-series analysis of the incident tickets retrieved in step 420.

In step 424, trend analysis tool 150 (see FIG. 1B) determines a change in the volume of incident tickets over a specified period of time based on the time-series analysis performed in step 422. If the volume of incident tickets has decreased over the specified time period according to the determination in step 424, then trend analysis tool 150 (see FIG. 1B) in step 410 records that the preventive action implemented in step 408 is effective at preventing the aforementioned defect (i.e., validates the preventive action as being effective). If the volume of tickets has not decreased over the specified time period according to the determination in step 424, then trend analysis tool 150 (see FIG. 1B) records in step 410 that the preventive action implemented in step 408 is not effective (i.e., does not validate the preventive action as being effective).

Cross-Pool Defect Reduction Exploration

FIG. 5 is a flowchart of a process of cross-pool defect reduction exploration, where the process is implemented in the system of FIGS. 1A-1B, in accordance with embodiments of the present invention. The process of FIG. 5 starts at step 500. Generate signature tool 128 (see FIG. 1A) sends candidate tickets and the group signature 502 to open investigation module 142 (see FIG. 1B). Candidate tickets and group signature 502 includes incident tickets in candidate ticket group 136 and group signature 134 (see FIG. 1B) and group signature 134 (see FIG. 1B). In one embodiment, candidate tickets and group signature 502 is the same as candidate and group signature 314 (see FIG. 3).

In step 504, open investigation module 142 (see FIG. 1B) receives candidate tickets and group signature 502 and opens an investigation of the candidate tickets for proactive prevention of the defect associated with the incident tickets in candidate tickets and group signature 502.

In step 506, root cause analysis module 144 (see FIG. 1B) determines a root cause of the defect indicated by the incident tickets in candidate tickets and group signature 502.

In step 508, implement module 146 (see FIG. 1B) implements a preventive action for preventing the defect indicated by the incident tickets in candidate tickets and group signature 502.

In step 510, validate and close module 148 (see FIG. 1B) validates the effectiveness of the preventive action implemented in step 508 and closes the investigation that was opened in step 504. Following step 510, the phase of the cross-pool defect reduction exploration process managed by the investigation management component 140 (see FIG. 1B) ends at step 512.

In step 514, similarity explorer tool 138 (see FIG. 1B) retrieves group signatures from interaction management database 139 (see FIG. 1B) that are similar to the group signature included in candidate tickets and group signature 502 based on a similarity index. The retrieved group signatures describe incident tickets from across pools of data that are different from the pool from which incident tickets were extracted to generate the group signature included in candidate tickets and group signature 502. In one embodiment, the different pools are based on different geographic locations. For example, incident tickets used to generate the group signature included in candidate tickets and group signature 502 may be from Country 1 and step 514 may retrieve group signatures X and Y that are similar to group signature 502, where group signature X is based on incident tickets from Country 2 and group signature Y is based on incident tickets from Country 3.

In step 516, similarity explorer tool 138 (see FIG. 1B) ranks the group signatures retrieved in step 514 based on the aforementioned similarity index and further based on a group weight (i.e., the weights assigned to the group signatures by assign weight to signature module 132 (see FIG. 1A)). The similarity index is a function of an unordered set based on keywords entered to search problem tickets, an ordered set based on an order of attributes selected as filtering constraints to search problem tickets, and an input signature. The group weight is a function of ticket volume and investigation count. Investigation count is the number of investigations that have been opened for a type of incident ticket.

In step 518, similarity explorer tool 138 (see FIG. 1B) extracts incident tickets for the group signatures that are top ranked based on the ranking in step 516.

In step 520, similarity explorer tool 138 (see FIG. 1B) evaluates recent time-series analyses to determine if the incident tickets extracted in step 518 are suitable candidates to add to the candidate tickets in candidate tickets and group signature 502.

In step 522, if similarity explorer tool 138 (see FIG. 1B) determines that the tickets extracted in step 518 are suitable to be added to candidate tickets 502 based on the evaluation performed in step 520, then the Yes branch of step 522 is taken and step 524 is performed. In step 524, similarity explorer tool 138 (see FIG. 1B) expands the candidate set by adding the tickets extracted in step 518. With an expanded candidate set resulting from step 524, one or more other defects related to the IT environment of candidate tickets and group signature 502 are investigated, and proactive actions are implemented to prevent the one or more other defects. Therefore, the process of FIG. 5 enables the identification of crucial common features within signatures of cross-pool tickets, thereby enabling a detection of similarity and opportunities for expanding proactive actions to reduce defects to multiple pools and multiple IT service delivery centers.

Returning to step 522, if similarity explorer tool 138 (see FIG. 1B) determines that the tickets extracted in step 518 are not suitable to be added to candidate tickets 502 based on the evaluation performed in step 520, then the No branch of step 522 is taken and step 526 is performed. In step 526, similarity explorer tool 138 (see FIG. 1B) does not expand the candidate set and the tickets extracted in step 518 are not added to candidate tickets 502.

Following step 524 and step 526, the process of FIG. 5 ends at step 512.

Computer System

Figure 6:
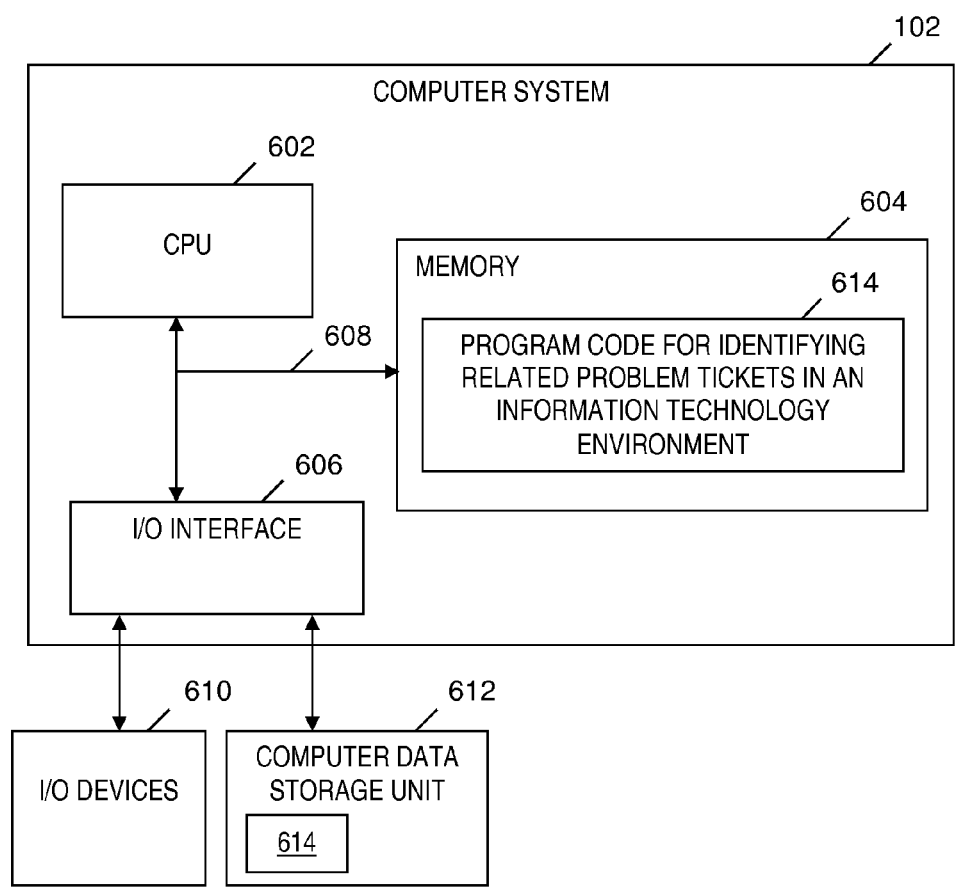
FIG. 6 is a block diagram of a computer system that is included in the system of FIGS. 1A-1B and that implements the process of FIG. 2, FIG. 3, FIG. 4 and/or FIG. 5, in accordance with embodiments of the present invention.

FIG. 6 is a block diagram of a computer system that is included in the system of FIGS. 1A-1B and that implements the process of FIG. 2, FIG. 3, FIG. 4 and/or FIG. 5, in accordance with embodiments of the present invention. Computer system 102 generally comprises a central processing unit (CPU) 602, a memory 604, an input/output (I/O) interface 606, and a bus 608. Further, computer system 102 is coupled to I/O devices 610 and a computer data storage unit 612. CPU 602 performs computation and control functions of computer system 102, including carrying out instructions included in program code 614 to perform a method of identifying related problem tickets in an IT environment, where the instructions are carried out by CPU 602 via memory 604. CPU 602 may comprise a single processing unit, or be distributed across one or more processing units in one or more locations (e.g., on a client and server). In one embodiment, program code 614 includes code for capture user interaction patterns tool 122 (see FIG. 1A), generate signature tool 128 (see FIG. 1A), auto classify by interaction patterns tool 108 (see FIG. 1A), similarity explorer tool 138 (see FIG. 1B), trend analysis tool 150 (see FIG. 1B) and generate classifiers tool 152 (see FIG. 1B).

Memory 604 may comprise any known computer-readable storage medium, which is described below. In one embodiment, cache memory elements of memory 604 provide temporary storage of at least some program code (e.g., program code 614) in order to reduce the number of times code must be retrieved from bulk storage while instructions of the program code are carried out. Moreover, similar to CPU 602, memory 604 may reside at a single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may comprise any type of transmission link, including electrical, optical, wireless, etc.

I/O interface 606 also allows computer system 102 to store information (e.g., data or program instructions such as program code 614) on and retrieve the information from computer data storage unit 612 or another computer data storage unit (not shown). Computer data storage unit 612 may comprise any known computer-readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are carried out by CPU 602 via memory 604 to identify related problem tickets in an IT environment. Although FIG. 6 depicts memory 604 as including program code 614, the present invention contemplates embodiments in which memory 604 does not include all of code 614 simultaneously, but instead at one time includes only a portion of code 614.

Further, memory 604 may include other systems not shown in FIG. 6, such as an operating system (e.g., Linux®) that runs on CPU 602 and provides control of various components within and/or connected to computer system 102. Linux is a registered trademark of Linus Torvalds in the United States.

Storage unit 612 and/or one or more other computer data storage units (not shown) that are coupled to computer system 102 may store incident tickets 106 (see FIG. 1A), candidate ticket group 136 (see FIG. 1B), group signature 134 (see FIG. 1B) and/or interaction management database 139 (see FIG. 1B).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 604 and/or computer data storage unit 612) having computer-readable program code (e.g., program code 614) embodied or stored thereon.

Any combination of one or more computer-readable mediums (e.g., memory 604 and computer data storage unit 612) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium can contain or store a program (e.g., program 614) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 614) embodied on a computer-readable medium may be transmitted using any appropriate medium, including but not limited to wireless, wireline, optical fiber cable, RF, etc., or any suitable combination of the foregoing.

Computer program code (e.g., program code 614) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks and logos are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3, FIG. 4 and FIG. 5) and/or block diagrams of methods, apparatus (systems) (e.g., FIGS. 1A-1B and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to one or more hardware processors (e.g., CPU 602) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 604 or computer data storage unit 612) that can direct a computer (e.g., computer system 102), other programmable data processing apparatus, or other devices to function in a particular manner, such that the instructions (e.g., program 614) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 614) which are carried out on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to identifying related problem tickets in an IT environment. Thus, an embodiment of the present invention discloses a process for supporting computer infrastructure, wherein the process comprises providing at least one support service for at least one of integrating, hosting, maintaining and deploying computer-readable code (e.g., program code 614) in a computer system (e.g., computer system 102) comprising one or more processors (e.g., CPU 602), wherein the processor(s) carry out instructions contained in the code causing the computer system to identify related problem tickets in an IT environment.

In another embodiment, the invention provides a method that performs the process steps of the invention on a subscription, advertising and/or fee basis. That is, a service provider, such as a Solution Integrator, can offer to create, maintain, support, etc. a process of identifying related problem tickets in an IT environment. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3, FIG. 4 and FIG. 5 and the block diagrams in FIGS. 1A-1B and FIG. 6 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 614), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of identifying related problem tickets in an information technology (IT) environment, the method comprising the steps of:
   a computer determining that a pattern of actions is effective at proactively preventing a problem in the IT environment based on a frequency at which one or more users performed interactions with a computer program, the interactions:
   including the pattern of actions,
   including a performance of a text analysis of content of the plurality of historical problem tickets,
   including a statistical analysis of the content of the plurality of historical problem tickets, and
   causing a determination that a plurality of historical problem tickets includes a group of problem tickets which is related to the problem;
   the computer generating an executable script based on the pattern of actions;
   based at least in part on the text analysis and the statistical analysis included in the interactions, the computer determining a root cause of the problem;
   in response to a receipt of a new problem ticket, the computer executing the script, which automatically performs the pattern of actions; and
   in response to executing the script, the computer classifying the new problem ticket as being included in the group of problem tickets related to the problem and determining the new problem ticket specifies the problem which has the root cause.

2. The method of claim 1, further comprising the step of the computer capturing in the interactions an application of a first filtering constraint to the plurality of historical problem tickets having respective severities before an application of a second filtering constraint, the first filtering constraint being a selection in a user interface of the computer program of a severity from the severities, and the second filtering constraint being a selection in a user interface of one or more attributes of the plurality of historical problem tickets other than the severity, wherein the step of determining the root cause is based in part on the applications of the first and second filtering constraints and the application of the first filtering constraint being before the application of the second filtering constraint.

3. The method of claim 1, further comprising the step of the computer generating and presenting to a user a visualization of behavior of the group of problem tickets in which the new problem ticket is classified.

4. The method of claim 1, further comprising the steps of:
   based on the interactions, the computer determining a group signature that includes the pattern of actions;
   the computer storing the group signature, a specification of the root cause of the group of problem tickets, and a preventive action implemented to prevent the root cause;
   the computer registering the group signature for trend analysis of incoming problem tickets;
   the computer retrieving incoming problem tickets based on the group signature;
   the computer performing a time-series analysis of the retrieved problem tickets;

based on the time-series analysis, the computer determining a volume of incoming problem tickets related to the problem is decreasing over a time period; and based on the group signature and the volume of the incoming problem tickets related to the problem decreasing over the time period, the computer determining the preventive action is effective at preventing the root cause.

5. The method of claim 2, further comprising the steps of:

based on the interactions, the computer determining a group signature that includes the pattern of actions and is associated with a first country from which the problem tickets in the group of problem tickets are extracted;

the computer storing the group signature, a specification of the root cause of the group of problem tickets, and a preventive action implemented to prevent the root cause;

the computer determining a similarity index based on a search for keywords in the content of the plurality of historical problem tickets and the first and second filtering constraints, and retrieving second and third group signatures that are similar to the group signature based on the similarity index and that are associated with problem tickets from second and third countries, respectively, which are different from the first country;

the computer assigning weights to the retrieved second and third group signatures and ranking the retrieved group signatures based on the similarity index and the weights assigned to the retrieved group signatures;

the computer determining the second and third group signatures have top ranks based on the step of ranking the retrieved group signatures and extracting second problem tickets for the second group signature and third problem tickets for the third group signature;

the computer performing a time-series analysis of the extracted second problem tickets and in response, expanding the group of problem tickets to include the second problem tickets;

the computer performing a time-series analysis of the extracted third problem tickets and in response, determining the extracted third problem tickets are not candidates to be added to the group of problem tickets; and based on the group of problem tickets being expanded with the extracted second problem tickets, the computer determining the preventive action specified by the group signature prevents a root cause of the extracted second problem tickets from the second country.

6. The method of claim 1, further comprising the step of the computer capturing in the interactions attributes of the historical problem tickets that are co-selected by a user in a user interface of the computer program to determine the root cause, wherein the step of determining the root cause is based in part on the co-selected attributes.

7. The method of claim 1, further comprising the step of:

providing at least one support service for at least one of creating, integrating, hosting, maintaining, and deploying computer-readable program code in the computer, the program code being executed by a processor of the computer to implement the steps of extracting, receiving, monitoring and storing interactions, identifying, determining the pattern of actions, generating, determining the root cause, executing the script, and classifying and determining the new problem ticket.

8. A computer system comprising:
a central processing unit (CPU);
a memory coupled to the CPU of the computer system;
a computer-readable, tangible storage device coupled to the CPU of the computer system, the storage device containing instructions that, when carried out by the CPU via the memory, implement a method of identifying related problem tickets in an information technology (IT) environment, the method comprising the steps of:

the computer system determining that a pattern of actions is effective at proactively preventing a problem in the IT environment based on a frequency at which one or more users performed interactions with a computer program, the interactions:
including the pattern of actions,
including a performance of a text analysis of content of the plurality of historical problem tickets,
including a statistical analysis of the content of the plurality of historical problem tickets, and
causing a determination that a plurality of historical problem tickets includes a group of problem tickets which is related to the problem;

the computer system generating an executable script based on the pattern of actions;

based at least in part on the text analysis and the statistical analysis included in the interactions, the computer system determining a root cause of the problem;

in response to a receipt of a new problem ticket, the computer system executing the script, which automatically performs the pattern of actions; and in response to executing the script, the computer system classifying the new problem ticket as being included in the group of problem tickets related to the problem and determining the new problem ticket specifies the problem which has the root cause.

9. The computer system of claim 8, wherein the method further comprises the step of the computer system capturing in the interactions an application of a first filtering constraint to the plurality of historical problem tickets having respective severities before an application of a second filtering constraint, the first filtering constraint being a selection in a user interface of the computer program of a severity from the severities, and the second filtering constraint being a selection in a user interface of one or more attributes of the plurality of historical problem tickets other than the severity, wherein the step of determining the root cause is based in part on the applications of the first and second filtering constraints and the application of the first filtering constraint being before the application of the second filtering constraint.

10. The computer system of claim 8, wherein the method further comprises the step of the computer system generating and presenting to a user a visualization of behavior of the group of problem tickets in which the new problem ticket is classified.

11. The computer system of claim 8, wherein the method further comprises the steps of:

based on the interactions, the computer system determining a group signature that includes the pattern of actions;

the computer system storing the group signature, a specification of the root cause of the group of problem tickets, and a preventive action implemented to prevent the root cause;

the computer system registering the group signature for trend analysis of incoming problem tickets;

the computer system retrieving incoming problem tickets based on the group signature;
the computer system performing a time-series analysis of the retrieved problem tickets;
based on the time-series analysis, the computer system determining a volume of incoming problem tickets related to the problem is decreasing over a time period; and
based on the group signature and the volume of the incoming problem tickets related to the problem decreasing over the time period, the computer system determining the preventive action is effective at preventing the root cause.

12. The computer system of claim 9, wherein the method further comprises the steps of:
based on the interactions, the computer system determining a group signature that includes the pattern of actions and is associated with a first country from which the problem tickets in the group of problem tickets are extracted;
the computer system storing the group signature, a specification of the root cause of the group of problem tickets, and a preventive action implemented to prevent the root cause;
the computer system determining a similarity index based on a search for keywords in the content of the plurality of historical problem tickets and the first and second filtering constraints, and retrieving second and third group signatures that are similar to the group signature based on the similarity index and that are associated with problem tickets from second and third countries, respectively, which are different from the first country;
the computer system assigning weights to the retrieved second and third group signatures and ranking the retrieved group signatures based on the similarity index and the weights assigned to the retrieved group signatures;
the computer system determining the second and third group signatures have top ranks based on the step of ranking the retrieved group signatures and extracting second problem tickets for the second group signature and third problem tickets for the third group signature;
the computer system performing a time-series analysis of the extracted second problem tickets and in response, expanding the group of problem tickets to include the second problem tickets;
the computer system performing a time-series analysis of the extracted third problem tickets and in response, determining the extracted third problem tickets are not candidates to be added to the group of problem tickets; and
based on the group of problem tickets being expanded with the extracted second problem tickets, the computer system determining the preventive action specified by the group signature prevents a root cause of the extracted second problem tickets from the second country.

13. The computer system of claim 8, wherein the method further comprises the step of the computer system capturing in the interactions attributes of the historical problem tickets that are co-selected by a user in a user interface of the computer program to determine the root cause, wherein the step of determining the root cause is based in part on the co-selected attributes.

14. A computer program product comprising:
a computer-readable storage medium; and
computer-readable program instructions stored on the computer-readable storage medium, the computer-readable program instructions, when carried out by a central processing unit (CPU) of a computer system, implement a method of identifying related problem tickets in an information technology (IT) environment, the method comprising the steps of:
the computer system determining that a pattern of actions is effective at proactively preventing a problem in the IT environment based on a frequency at which one or more users performed interactions with a computer program, the interactions:
including the pattern of actions,
including a performance of a text analysis of content of the plurality of historical problem tickets,
including a statistical analysis of the content of the plurality of historical problem tickets, and
causing a determination that a plurality of historical problem tickets includes a group of problem tickets which is related to the problem;
the computer system generating an executable script based on the pattern of actions;
based at least in part on the text analysis and the statistical analysis included in the interactions, the computer system determining a root cause of the problem;
in response to a receipt of a new problem ticket, the computer system executing the script, which automatically performs the pattern of actions; and
in response to executing the script, the computer system classifying the new problem ticket as being included in the group of problem tickets related to the problem and determining the new problem ticket specifies the problem which has the root cause.

15. The computer program product of claim 14, wherein the method further comprises the step of the computer system capturing in the interactions an application of a first filtering constraint to the plurality of historical problem tickets having respective severities before an application of a second filtering constraint, the first filtering constraint being a selection in a user interface of the computer program of a severity from the severities, and the second filtering constraint being a selection in a user interface of one or more attributes of the plurality of historical problem tickets other than the severity, wherein the step of determining the root cause is based in part on the applications of the first and second filtering constraints and the application of the first filtering constraint being before the application of the second filtering constraint.

16. The computer program product of claim 14, wherein the method further comprises the step of the computer system generating and presenting to a user a visualization of behavior of the group of problem tickets in which the new problem ticket is classified.

17. The computer program product of claim 14, wherein the method further comprises the steps of:
based on the interactions, the computer system determining a group signature that includes the pattern of actions;
the computer system storing the group signature, a specification of the root cause of the group of problem tickets, and a preventive action implemented to prevent the root cause;
the computer system registering the group signature for trend analysis of incoming problem tickets;
the computer system retrieving incoming problem tickets based on the group signature;

the computer system performing a time-series analysis of the retrieved problem tickets;

based on the time-series analysis, the computer system determining a volume of incoming problem tickets related to the problem is decreasing over a time period; and based on the group signature and the volume of the incoming problem tickets related to the problem decreasing over the time period, the computer system determining the preventive action is effective at preventing the root cause.

18. The computer program product of claim 15, wherein the method further comprises the steps of:

based on the interactions, the computer system determining a group signature that includes the pattern of actions and is associated with a first country from which the problem tickets in the group of problem tickets are extracted;

the computer system storing the group signature, a specification of the root cause of the group of problem tickets, and a preventive action implemented to prevent the root cause;

the computer system determining a similarity index based on a search for keywords in the content of the plurality of historical problem tickets and the first and second filtering constraints, and retrieving second and third group signatures that are similar to the group signature based on the similarity index and that are associated with problem tickets from second and third countries, respectively, which are different from the first country;

the computer system assigning weights to the retrieved second and third group signatures and ranking the retrieved group signatures based on the similarity index and the weights assigned to the retrieved group signatures;

the computer system determining the second and third group signatures have top ranks based on the step of ranking the retrieved group signatures and extracting second problem tickets for the second group signature and third problem tickets for the third group signature;

the computer system performing a time-series analysis of the extracted second problem tickets and in response, expanding the group of problem tickets to include the second problem tickets;

the computer system performing a time-series analysis of the extracted third problem tickets and in response, determining the extracted third problem tickets are not candidates to be added to the group of problem tickets; and based on the group of problem tickets being expanded with the extracted second problem tickets, the computer system determining the preventive action specified by the group signature prevents a root cause of the extracted second problem tickets from the second country.

19. The computer program product of claim 14, wherein the method further comprises the step of the computer system capturing in the interactions attributes of the historical problem tickets that are co-selected by a user in a user interface of the computer program to determine the root cause, wherein the step of determining the root cause is based in part on the co-selected attributes.

* * * * *